US007732971B2

(12) United States Patent
Yu et al.

(10) Patent No.: US 7,732,971 B2
(45) Date of Patent: Jun. 8, 2010

(54) CARBON BRUSH HOLDER

(75) Inventors: Meng-Chiu Yu, Taichung (TW); Su-Chen Liao, Taichung Coty (TW)

(73) Assignee: Taiwan Long Hawn Enterprise Co., Taichung (TW)

( * ) Notice: Subject to any disclaimer, the term of this patent is extended or adjusted under 35 U.S.C. 154(b) by 289 days.

(21) Appl. No.: 11/756,754

(22) Filed: Jun. 1, 2007

(65) Prior Publication Data
US 2008/0296995 A1 Dec. 4, 2008

(51) Int. Cl.
H02K 5/14 (2006.01)
(52) U.S. Cl. .................. 310/242; 310/245; 310/246; 310/247; 310/248
(58) Field of Classification Search .......... 310/239, 310/242, 245, 246, 247, 248
See application file for complete search history.

(56) References Cited
U.S. PATENT DOCUMENTS
3,034,006 A * 5/1962 Short ................... 310/247

5,262,694 A * 11/1993 Frank ................... 310/239

* cited by examiner

Primary Examiner—Quyen Leung
Assistant Examiner—Terrance Kenerly
(74) Attorney, Agent, or Firm—Browdy and Neimark, PLLC

(57) ABSTRACT

A carbon brush holder includes an insulated housing having a through hole with a first section, a second section and a stepped portion between the first and second sections. A carbon brush-holding member is inserted into the first section of the insulated housing and has a first end face, a second end face opposite to the first end face, and an insertion portion adjoined with the second end face. The insertion portion of the carbon brush-holding member extends into the second section of the insulated housing, thereby enabling the second end face of the carbon brush-holding member to be located in the second section of the insulated housing. Thus, the second end face of the carbon brush-holding member can firmly contact a conductive member that is disposed inside the second section of the insulated housing and electrically connected with a carbon brush inserted into the carbon brush-holding member.

1 Claim, 3 Drawing Sheets

CARBON BRUSH HOLDER

BACKGROUND OF THE INVENTION

1. Field of the Invention

The present invention relates generally to motor parts and more specifically, to a carbon brush holder for use in a motor.

2. Description of the Related Art

Referring to FIG. 1 and FIG. 2, a conventional carbon brush holder mainly comprises an insulated housing 1 and a carbon brush-holding member 2 made of copper. The insulated housing 1 has a through hole with a first section 1a for insertion of the carbon brush-holding member 2 and a second section 1b, which is larger in diameter than the first section 1a such that a stepped portion is formed therebetween the first section 1a and the second section 1b. The second section 1b is provided at an inner periphery thereof with an internal thread 1c. When the conventional carbon brush holder is assembled, a carbon brush 3, which is electrically connected with a conductive member 6 through a lead wire 4 and a spring 5 surrounding the lead wire 4, is inserted into carbon brush-holding member 2, and subsequently a cover 7 is threaded into the internal thread 1e of the insulated housing 1 to press and force the conductive member 6 to be in contact with the top end face of the carbon brush-holding member 2. Thus, the carbon brush-holding member 2 can supply power to the carbon brush 3 through an external power source.

As indicated above, the conductive member 6 and the carbon brush-holding member 2 have to be closely contacted with each other for enabling the electric current to flow through the carbon brush-holding member 2, the conductive member 6, the lead wire 4, and finally the carbon brush 3 by contact conduction. However, the top end face of the carbon brush-holding member 2 is flush with the stepped portion of the insulated housing 1 in the optimum condition due to the restriction of the internal thread 1c of the insulated housing 1, resulting in that the conductive member 6 may be blocked by the stepped portion of the insulated housing 1 to cause discontact of the conductive member 6 from the copper carbon brush-holding member 2. Such imperfect or malfunctioned conduction between the conductive member 6 and the carbon brush-holding member 2 will generally cause arcs and sparkles or incomplete conduction of electricity.

SUMMARY OF THE INVENTION

The present invention has been accomplished in view of the above-noted circumstances. It is therefore one objective of the present invention to provide a carbon brush holder, which enables the carbon brush-holding member thereof to be firmly contacted with the conductive member thereof.

To achieve this objective of the present invention, the carbon brush holder comprises an insulated housing and a carbon brush-holding member. The insulated housing includes a through hole having a first section and a second section, which is larger in diameter than the first section such that a stepped portion is formed between the first and second sections. The carbon brush-holding member is inserted into the first section of the through hole of the insulated housing and has a first end face, a second end face opposite to the first send face, and an insertion portion adjoined with the second end face. The insertion portion extends through the stepped portion of the through hole of the insulated housing into the second section of the through hole of the insulated housing, thereby enabling the second end face of the carbon brush-holding member to be located in the second section of the through hole of the insulated housing. As a result, the second end face of the carbon brush-holding member can firmly contact a conductive member, which is disposed inside the second section of the insulated housing and electrically connected, through a lead wire, with a carbon brush inserted into the carbon brush-holding member.

In a preferred embodiment of the present invention, the insertion portion of the carbon brush-holding member is smaller in diameter than other part of the brushing-holding member so that the insertion portion can extend into the second section of the insulted housing. For providing the insertion section of smaller diameter, the insertion portion of the carbon brush-holding member includes a plurality of beveled surfaces adjoined with the second end face of the carbon brush-holding member. Alternatively, the insertion portion of the carbon brush-holding member can include a plurality of cambered surfaces adjoined with the second end face of the carbon brush-holding member.

By means of the aforesaid design, the second end face of the carbon brush-holding member can firmly contact the conductive member to provide good conductivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
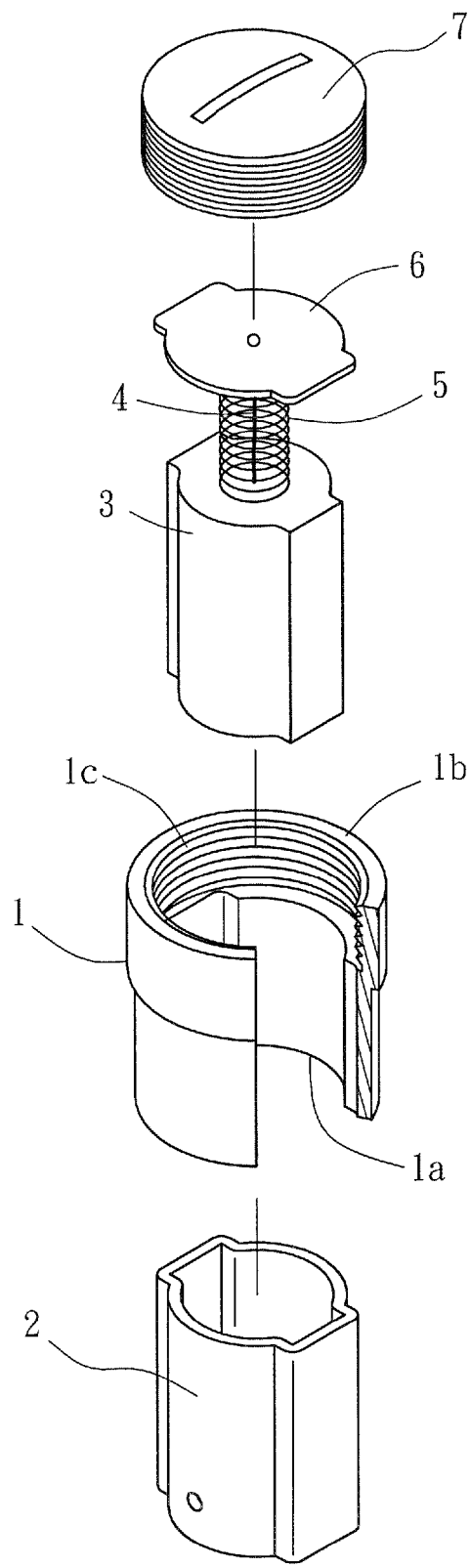
FIG. 1 is an exploded view of a carbon brush holder of a prior art.
Figure 2:
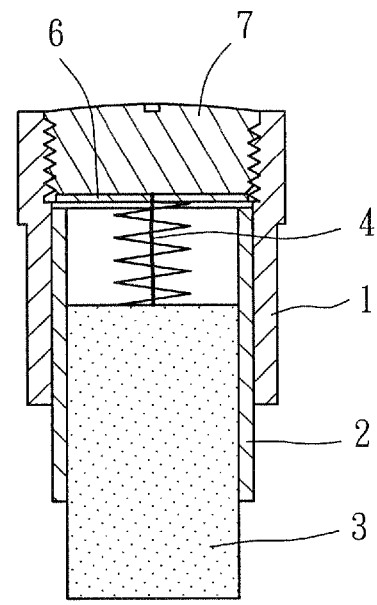
FIG. 2 is a sectional view of the carbon brush holder of the prior art.
Figure 3:
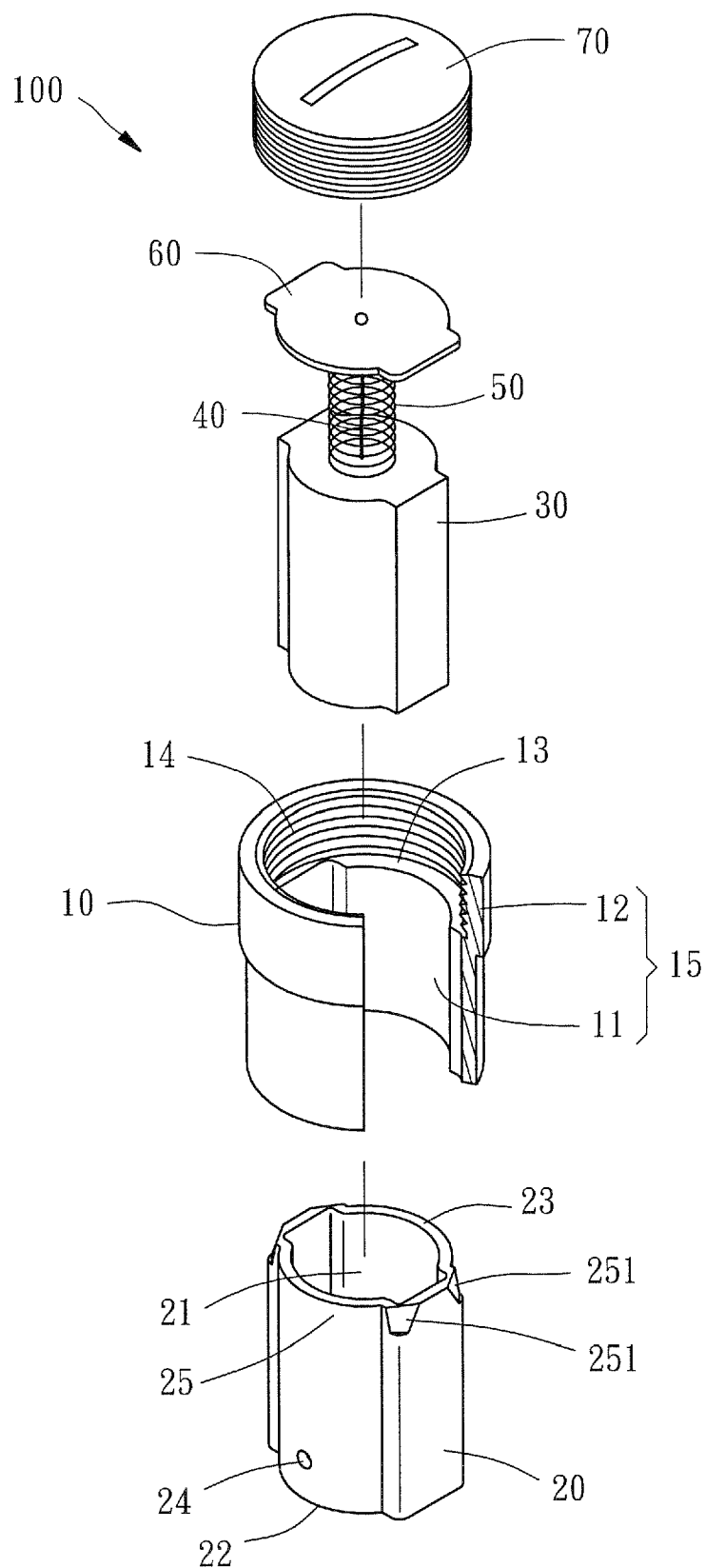
FIG. 3 is an exploded view of a preferred embodiment of the present invention.
Figure 4:
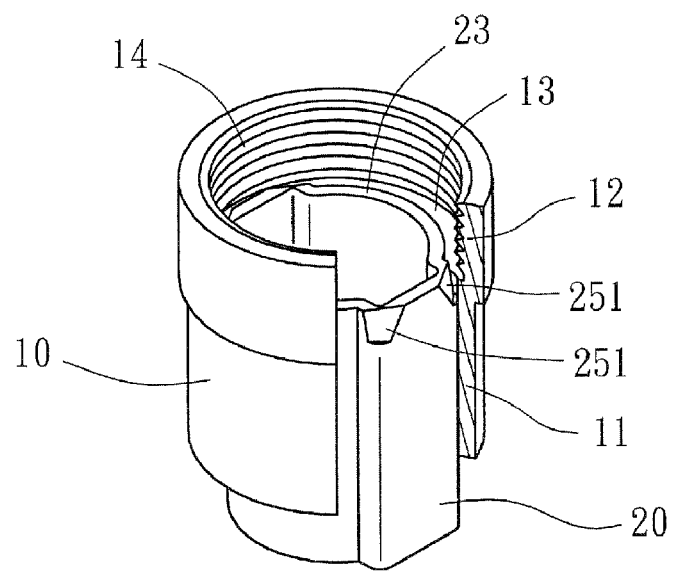
FIG. 4 is a partial cutaway view of the preferred embodiment of the present invention, showing the beveled surfaces of the insertion portion of the carbon brush-holding member.
Figure 5:
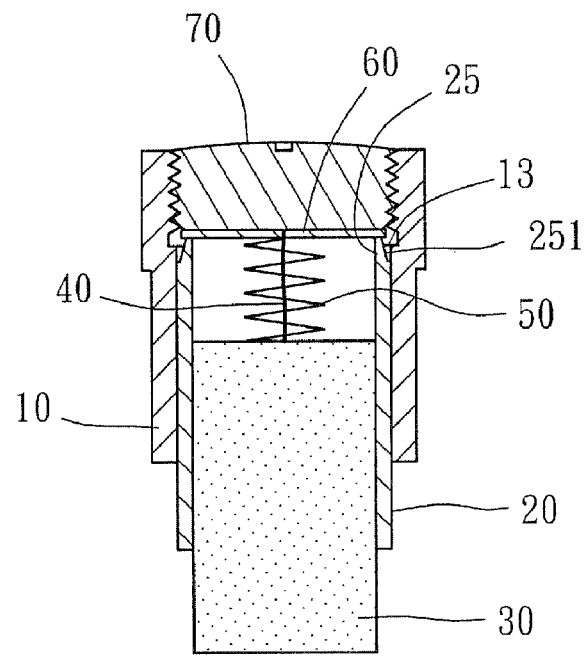
FIG. 5 is a sectional view of the preferred embodiment of the present invention.

As shown in FIG. 3 to FIG. 5, a carbon brush holder 100 in accordance with a preferred embodiment of the present invention comprises an insulated housing 10 and a carbon brush-holding member 20.

The insulated housing 10 is made of insulated material, such as plastics or Bakelite, having a through hole 15 with a first section 11 and a second section 12, which is larger in diameter than the first section 11 such that a stepped portion 13 is formed between the first section 11 and the second section 13. Two slots are provided on an inner wall of the first section 11. Each of the slots has an end open at the stepped portion. The second section 13 of the through hole 15 is provided at an inner periphery thereof with an internal thread 14 for threadedly fitting with a cover 70.

The carbon brush-holding member 20 is made of electrically conductive material, such as copper, aluminum, and etc., having a receiving hole 21 for accommodation of a carbon brush 30, a first end face 22, a connecting hole 24 adjacent to the first end face 22 for electrically connecting an external power source, a second end face 23 opposite to the first end face 22, and an insertion portion 25 adjoined with the second end face 23. Two rectangular blocks project from an outer side of the carbon brush-holding member 20. Each of the rectangular blocks has two parallel lateral sides projected from an outer side of the carbon brush-holding member and a top side on a top thereof. The rectangular block engage with the slots of the insulated member 10, when the carbon brush-holding member 20 is inserted into the first section 11 of the through hole 15 of the insulating housing 10. The insertion portion 25, on each of the two rectangular blocks, is chamfered on two lateral sides thereof to form four beveled surfaces 251, i.e. the insertion portion 25 has a profile in the form of truncated conoid, such that the diameter of the insertion portion 25 is smaller than the diameter of the other part of the carbon brush-holding member 20 and the diameter of the second section 12 of the through hole 15 of the insulated housing 10. The beveled surfaces are received in the second section 12 of the through hole 15 of the insulated housing 10 in such a way that a gap is formed between each of the beveled surfaces of the carbon brush-holding member and the internal thread 14 of the second section 12 of the through hole 15 of the insulated housing 10. Alternatively, the insertion portion 25 can be also chamfered arcly on the two lateral sides thereof to form four camfered surfaces.

When the carbon brush holder 100 is assembled, the insertion portion 25 of the carbon brush-holding member 20 can extend through the stepped portion 13 of the insulated housing 10 into the second section 12, such that the second end face 23 of the carbon brush-holding member 20 can be located in the second section 12 of the insulated housing 10. The carbon brush 30 is inserted into the receiving hole 21 of the carbon brush-holding member 20, such that a conductive member 60 connected with the carbon brush 30 through a lead wire 40 and a spring 50 surrounding the lead wire 40 can be situated in the second section 12 of the insulated housing 10, and the cover 70 is threaded into the inner thread 14 of the insulated housing 10 to press and force the conductive member 60 to be positively in contact with the second end face 23 of the carbon brush-holding member 20, as shown in FIG. 5. In other words, the conductive member 60 can be firmly contacted with the second end face 23 of the carbon brush-holding member 20 due to the presence of the beveled surfaces 251 of the insertion portion 25 of the carbon brush-holding member 20, which produces a small diameter of the insertion portion 25 that will not interfere with the internal thread 14 so that the insertion portion 25 can extend into the second section 12 of the insulted housing 10 to contact the conductive member 60 positively. As a result, the power source electrically connected with the carbon brush-holding member 20 can assuredly supply power to the carbon brush 30 through the conductive member 60, thereby improving the defect of the prior art and achieving the objective of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A carbon brush holder comprising:

an insulated housing having a through hole with a first section and a second section, which has a larger diameter than a diameter of the first section such that a stepped portion is formed between the first section and the second section, wherein two slots are provided on an inner wall of the first section, each of the slots has an end open at the stepped portion, and an internal thread is provided on an inner wall of the second section; and a carbon brush-holding member, which has a first end face and a second end face opposite to the first end face, and two rectangular blocks projected from an outer side thereof, inserted into the first section of the through hole of the insulated housing with the rectangular blocks engaged with the slots of the insulated housing, wherein each of the rectangular blocks has two parallel lateral sides projected from an outer side of the carbon brush-holding member and a top side on a top thereof, wherein each of the rectangular blocks has two beveled surfaces at junctions of the lateral sides, the top side, and the second end face, respectively, and wherein the beveled surfaces are received in the second section of the through hole of the insulated housing to form a gap between each of the beveled surfaces of the carbon brush-holding member and the internal thread of the second section of the through hole of the insulated housing.

* * * * *